(12) United States Patent
Westin et al.

(10) Patent No.: US 11,416,646 B2
(45) Date of Patent: Aug. 16, 2022

(54) INTEGRATED DEVELOPMENT ENVIRONMENT TO ESTABLISH A DIGITAL THREAD IN THE LIFECYCLE OF A STRUCTURAL PRODUCT

(71) Applicant: THE BOEING COMPANY, Chicago, IL (US)

(72) Inventors: Benjamin A. Westin, Charleston, SC (US); Terry R. Vogler, Charleston, SC (US); Thomas D. Mitchum, Jr., North Charleston, SC (US)

(73) Assignee: The Boeing Company, Chicago, IL (US)

( * ) Notice: Subject to any disclaimer, the term of this patent is extended or adjusted under 35 U.S.C. 154(b) by 181 days.

(21) Appl. No.: 16/833,080

(22) Filed: Mar. 27, 2020

(65) Prior Publication Data
US 2021/0303749 A1    Sep. 30, 2021

(51) Int. Cl.
*G06F 30/15*    (2020.01)
*G06F 30/23*    (2020.01)
(Continued)

(52) U.S. Cl.
CPC .............. *G06F 30/15* (2020.01); *G06F 30/12* (2020.01); *G06F 30/23* (2020.01); *G06F 2111/10* (2020.01); *G06F 2113/28* (2020.01)

(58) Field of Classification Search
CPC .......... G06F 30/00; G06F 30/15; G06F 30/12; G06F 30/23; G06F 2113/28;
(Continued)

(56) References Cited

U.S. PATENT DOCUMENTS

| | | | |
|---|---|---|---|
| 2006/0173662 A1* | 8/2006 | Kazama | G06F 30/367 703/4 |
| 2010/0010794 A1* | 1/2010 | Sweers | G06F 30/20 703/8 |
| 2018/0196409 A1 | 7/2018 | Ben-Bassat et al. | |

FOREIGN PATENT DOCUMENTS

| | | | | |
|---|---|---|---|---|
| CN | 108387802 A | * | 8/2018 | |
| CN | 110893914 A | * | 3/2020 | ......... G01R 29/0842 |

OTHER PUBLICATIONS

Alexandersson, Sabine "Automotive Electromagnetic Compatibility", 2008, Department of Industrial Electrical Engineering and Automation, Lund University. (Year: 2008).*
(Continued)

*Primary Examiner* — Cedric Johnson
(74) *Attorney, Agent, or Firm* — Womble Bond Dickinson (US) LLP

(57) ABSTRACT

An apparatus for designing a structural product includes memory to store computer-readable program code for an integrated development environment to establish a digital thread in a lifecycle of the structural product, and processing circuitry to execute the computer-readable program code. The apparatus is thereby caused to generate a graphical user interface from which the integrated development environment is accessible to cause the apparatus to generate an electromagnetic effects (EME) model of the structural product from authoritative data including a solid model of the structural product, and parameterize the EME model with one or more electrical properties. The apparatus is caused to produce a computational electromagnetics (CEM) model of the structural product from the parameterized EME model, perform a CEM analysis from the CEM model to generate a corresponding solution is generated, and post-process the corresponding solution.

20 Claims, 12 Drawing Sheets

(51) Int. Cl.
*G06F 30/12* (2020.01)
*G06F 113/28* (2020.01)
*G06F 111/10* (2020.01)

(58) Field of Classification Search
CPC ...... G06F 2111/10; G06F 30/17; G06F 30/18; G06F 30/20; G06F 30/3308
USPC .......................................................... 703/2
See application file for complete search history.

(56) References Cited

OTHER PUBLICATIONS

Gutierrez, Guadalupe G. et al., "Influence of Geometric Simplifications on Lightning Strike Simulations", 2018, Progress in Electromagnetics Research C, vol. 83, (Year: 2018).*

He, T. et al., "Time Domain Finite Difference Validation for Transport Aircraft Lightning Induced Effect Studies", 1995, IEEE. (Year: 1995).*

Monferran, Paul et al., "Lightning Currents on Fastening Assemblies of an Aircraft Fuel Tank- Part III: Validation of the Current Assessment Method with Measurement", Oct. 5, 2020, IEEE Transactions on Electromagnetic Compatibility, vol. 62, No. 5, IEEE. (Year: 2020).*

* cited by examiner

LDE HEALTH CHECK ASSESSMENT

[ TOOL DESCRIPTION ] [ CATIA LOCKED ]

[ SELECT ALL ] [ CLEAR SELECTION ]

FIND SUB-GRID SIZES ABOVE (IN) [ 30 ]
FIND PART SEPARATIONS LESS THAN (IN) [ 0.5 ]

HEALTH TEST
- ☑ GET COUNTS OF ITEMS IN MODEL
- ☑ IS THE PRODUCT TREE FLAT?
- ☑ IS SUB-GRIDDING SUFFICIENT?
- ☑ HOW FAR ARE PARTS GAPPED?
- ☑ ARE MATERIALS AND THICKNESSES ASSIGNED?
- ☑ IS THERE AN 'ATTACHMENT' PART INCLUDED?

[ RUN CHECK ]
[ ABORT ]

| CHECK | MESSAGE |
|---|---|
| RUNNING GEOMETRY CHECK... | ############################################ |
| FOR CHECK AGAINST LINE COUNT | FOUND 3 OF 3 PARTS SHOWN AND 0 OF 0 SUB-PRODUCTS SHOWN AT THE TOP LEVEL OF THE MODEL. FASTENERS + NLR + ORIGINAL_FASTENERS + ATTACHMENTS = 0 |
|  | FOUND 378 GEOMETRIC FEATURES SHOWN WITHIN THE MODEL: |
|  | 0 POINT(S) SHOWN. |
|  | 0 LINE(S) SHOWN. |
|  | 378 SURFACE(S) SHOWN. |
|  | 0 AXIS SYSTEM(S) SHOWN. |
|  | 0 OTHER, INCLUDING SOLIDS, SHOWN. |
| RUNNING TREE ASSESSMENT... | ############################################ |
|  | PRODUCT TREE APPEARS TO BE STRUCTURED CORRECTLY. |
| RUNNING SUB-GRID ASSESSMENT... | ############################################ |
| 'MS012A1016-3161' | RECOMMEND 2 OF 36 SURFACES BE SUB-GRIDDED; THESE HAVE BEEN RECOLORED. |
| 'MS012A1016-1203' | RECOMMEND 156 OF 240 SURFACES BE SUB-GRIDDED; THESE HAVE BEEN RECOLORED. |
| 'MS012A1016-3160' | RECOMMEND 8 OF 102 SURFACES BE SUB-GRIDDED; THESE HAVE BEEN RECOLORED. |
| CHECKING FOR MINIMUM PART GAPS... | ############################################ |
| FROM MS012A1016-3161.1 | 0.0 INCHES TO MS012A1016-3160.1 |
| CHECKING MATERIAL & THICKNESS ASSIGNMENTS... | ############################################ |
|  | 3 PARTS ARE MISSING PARAMETERS |
|  | USE 'ASSIGN MATERIALS TO PARTS' TO ASSIGN THESE. |
| CHECKING ATTACHMENTS PART... | ############################################ |
|  | NO 'ATTACHMENT' PART FOUND. |
| REQUESTED HEALTH CHECKS COMPLETED. | ############################################ |

FIG. 8

INTEGRATED DEVELOPMENT ENVIRONMENT TO ESTABLISH A DIGITAL THREAD IN THE LIFECYCLE OF A STRUCTURAL PRODUCT

TECHNOLOGICAL FIELD

The present disclosure relates generally to designing and manufacturing a structural product, and in particular, to an integrated development environment to establish a digital thread in the lifecycle of a structural product.

BACKGROUND

Electromagnetic effects (EME) uses computational electromagnetics models to analyze many types of electromagnetic threats to structural products, which is useful in the design, manufacture and sustainment of these structural products. These threats include radiated and conducted energy due to lightning and other threats, as well as electrostatics. These threats are a concern of many industries such as the aircraft, power generation and petrochemical industries. Certain structural products in these industries are susceptible to lightning strikes and other electromagnetic threats.

Each EME threat requires a specific model of the same structural-product design, and these models often take months to build. Existing approaches to building EME models typically include a modeler requesting design data from design engineers via email, and manually converting their interpretation of the data into an EME model. This conversion often does not tie back to an authoritative design of the structural product, or provide traceability for changes in the design. Scalability is also often not feasible for models of structural products with thousands of fasteners, hundreds of cable bundles, and detailed structural elements.

It would therefore be desirable to have a system and method that takes into account at least some of the issues discussed above, as well as other possible issues.

BRIEF SUMMARY

Example implementations of the present disclosure are directed to the design and manufacture of a structural product such as an aircraft. In particular, example implementations are directed to an integrated development environment to establish a digital thread in the lifecycle of a structural product. In the context of a structural product, a digital thread is known to describe a framework to connect data flows and produce a holistic view of the structural product's data across its lifecycle, and with traceability of the structural product's data. In this regard, the integrated development environment of example implementations leverages model-based approaches to EME modeling that are more traceable, accurate, reusable and efficient.

According to various example implementations, the integrated development environment of example implementations may guide a modeler through an entire EME modeling workflow, and provide tools to access and transform authoritative data for the structural product and transform it into an EME model per the requirements of a given analysis. The integrated development environment may automate challenging aspects of creating an EME model, and use guided tutorials with images to walk the modeler through some operations to create the EME model. The EME model may be preconditioned improved meshing and run-time in computational solvers. Health checks may assess whether modeling best practices are followed at various checkpoints to ensure first time quality, and results from various simulations may be aggregated and visualized to perform trades and product-level assessments.

The integrated development environment of example implementations may create traceability from authoritative data to models to results, and back to the authoritative data. The integrated development environment may enable detailed threat analysis on various structural products, including down to a wing-scale model for aircraft. The integrated development environment may establish standard, repeatable workflows, and improve modeling efficiency and re-work by an order of magnitude over existing approaches.

The present disclosure thus includes, without limitation, the following example implementations.

Some example implementations provide an apparatus for designing a structural product that includes component parts joined by fasteners, and an installation of electrical wiring, the apparatus comprising a memory configured to store computer-readable program code for an integrated development environment to establish a digital thread in a lifecycle of the structural product; and processing circuitry configured to access the memory, and execute the computer-readable program code to cause the apparatus to generate a graphical user interface (GUI) from which the integrated development environment is accessible to cause the apparatus to at least access a source of authoritative data for the structural product, the authoritative data including a solid model of the structural product, definitions of the fasteners, and definitions of the electrical wiring; generate an electromagnetic effects (EME) model of the structural product from the authoritative data, including the apparatus caused to: defeature the solid model to generate a corresponding non-solid model of the structural product; draw the fasteners onto the corresponding non-solid model based on the definitions of the fasteners; and draw the electrical wiring onto the corresponding non-solid model based on the definitions of the electrical wiring; parameterize the EME model with one or more electrical properties of the component parts, the fasteners and the electrical wiring, and thereby produce a parameterized EME model; produce a computational electromagnetics (CEM) model of the structural product from the parameterized EME model, the CEM model representing the component parts, the fasteners and the electrical wiring by a mesh of elements; perform a CEM analysis in which the CEM model of the structural product is exposed to a simulated EME threat to predict an impact of a corresponding EME threat on the structural product, and from which a corresponding solution is generated; and post-process the corresponding solution.

Some example implementations provide a computer-readable storage medium for designing a structural product that includes component parts joined by fasteners, and an installation of electrical wiring, the computer-readable storage medium being non-transitory and having stored therein computer-readable program code for an integrated development environment to establish a digital thread in a lifecycle of the structural product, the computer-readable program code being executable by processing circuitry to cause an apparatus to generate a graphical user interface (GUI) from which the integrated development environment is accessible to cause the apparatus to at least access a source of authoritative data for the structural product, the authoritative data including a solid model of the structural product, definitions of the fasteners, and definitions of the electrical wiring; generate an electromagnetic effects (EME) model of the structural product from the authoritative data, including the apparatus caused to: defeature the solid model to generate a corresponding non-solid model of the structural product; draw the fasteners onto the corresponding non-solid model based on the definitions of the fasteners; and draw the electrical wiring onto the corresponding non-solid model based on the definitions of the electrical wiring; parameterize the EME model with one or more electrical properties of the component parts, the fasteners and the electrical wiring, and thereby produce a parameterized EME model; produce a computational electromagnetics (CEM) model of the structural product from the parameterized EME model, the CEM model representing the component parts, the fasteners and the electrical wiring by a mesh of elements; perform a CEM analysis in which the CEM model of the structural product is exposed to a simulated EME threat to predict an impact of a corresponding EME threat on the structural product, and from which a corresponding solution is generated; and post-process the corresponding solution.

In some example implementations of the apparatus or computer-readable storage medium of any preceding example implementation, or any combination of any preceding example implementations, the GUI includes a plurality of graphical control elements arranged to guide a user through the integrated development environment, the plurality of graphical control elements including graphical control elements that are user-selectable to cause the apparatus to generate the EME model, parameterize the EME model, and produce the CEM model.

In some example implementations of the apparatus or computer-readable storage medium of any preceding example implementation, or any combination of any preceding example implementations, distinct EME threats have respective model requirements, and the apparatus caused to defeature the solid model includes the apparatus caused to receive user-selection of an EME threat from the distinct EME threats, and defeature the solid model according to the respective model requirements of the EME threat.

In some example implementations of the apparatus or computer-readable storage medium of any preceding example implementation, or any combination of any preceding example implementations, the integrated development environment provides distinct types of the component parts associated with methods of defeaturing, at least some of the methods of defeaturing being different for different ones of the distinct types of the component parts, and wherein the apparatus caused to defeature the solid model includes the apparatus caused to receive user-selection of a type of component part from the distinct types of the component parts, and defeature those of the component parts of the type of component part according to a method of the methods associated therewith.

In some example implementations of the apparatus or computer-readable storage medium of any preceding example implementation, or any combination of any preceding example implementations, the apparatus caused to generate the EME model further includes the apparatus caused to sub-grid one or more surfaces of the corresponding non-solid model to generate a larger number of corresponding smaller surfaces.

In some example implementations of the apparatus or computer-readable storage medium of any preceding example implementation, or any combination of any preceding example implementations, the apparatus caused to draw the fasteners includes the apparatus caused to at least draw line segments for the fasteners onto the corresponding non-solid model based on the definitions of the fasteners; determine intersections between the line segments and surfaces of the corresponding non-solid model; and redraw the line segments between surface faces based on the intersections, the line segments as redrawn representing the fasteners in the corresponding non-solid model.

In some example implementations of the apparatus or computer-readable storage medium of any preceding example implementation, or any combination of any preceding example implementations, the apparatus caused to parameterize the EME model includes the apparatus caused to assign electrical conductivity values to surfaces of corresponding non-solid model representing the component parts, and assign electrical resistance values to line segments on the corresponding non-solid model representing the fasteners.

In some example implementations of the apparatus or computer-readable storage medium of any preceding example implementation, or any combination of any preceding example implementations, the apparatus caused to parameterize the EME model includes the apparatus caused to assign one or more of electrical self-impedance, electrical mutual-impedance or electromagnetic shielding values to line segments on the corresponding non-solid model representing the electrical wiring.

Some example implementations provide a method of designing a structural product that includes component parts joined by fasteners, and an installation of electrical wiring, the method comprising storing in memory computer-readable program code for an integrated development environment to establish a digital thread in a lifecycle of the structural product; and executing the computer-readable program code, via processing circuitry configured to access the memory, to cause an apparatus to generate a graphical user interface (GUI) from which the integrated development environment is accessible for at least: accessing a source of authoritative data for the structural product, the authoritative data including a solid model of the structural product, definitions of the fasteners, and definitions of the electrical wiring; generating an electromagnetic effects (EME) model of the structural product from the authoritative data, including: defeaturing the solid model to generate a corresponding non-solid model of the structural product; drawing the fasteners onto the corresponding non-solid model based on the definitions of the fasteners; and drawing the electrical wiring onto the corresponding non-solid model based on the definitions of the electrical wiring; parameterizing the EME model with one or more electrical properties of the component parts, the fasteners and the electrical wiring, and thereby producing a parameterized EME model; producing a computational electromagnetics (CEM) model of the structural product from the parameterized EME model, the CEM model representing the component parts, the fasteners and the electrical wiring by a mesh of elements; performing a CEM analysis in which the CEM model of the structural product is exposed to a simulated EME threat to predict an impact of a corresponding EME threat on the structural product, and from which a corresponding solution is generated; and post-processing the corresponding solution.

In some example implementations of the method of any preceding example implementation, or any combination of any preceding example implementations, the computer-readable program code is executed to cause the apparatus to generate the GUI including a plurality of graphical control elements arranged to guide a user through the integrated development environment, the plurality of graphical control elements including graphical control elements that are user-selectable for generating the EME model, parameterizing the EME model, and producing the CEM model.

In some example implementations of the method of any preceding example implementation, or any combination of any preceding example implementations, distinct EME threats have respective model requirements, and defeaturing the solid model includes receiving user-selection of an EME threat from the distinct EME threats, and defeaturing the solid model according to the respective model requirements of the EME threat.

In some example implementations of the method of any preceding example implementation, or any combination of any preceding example implementations, the integrated development environment provides distinct types of the component parts associated with methods of defeaturing, at least some of the methods of defeaturing being different for different ones of the distinct types of the component parts, and wherein defeaturing the solid model includes receiving user-selection of a type of component part from the distinct types of the component parts, and defeaturing those of the component parts of the type of component part according to a method of the methods associated therewith.

In some example implementations of the method of any preceding example implementation, or any combination of any preceding example implementations, generating the EME model further includes sub-gridding one or more surfaces of the corresponding non-solid model to generate a larger number of corresponding smaller surfaces.

In some example implementations of the method of any preceding example implementation, or any combination of any preceding example implementations, drawing the fasteners includes at least drawing line segments for the fasteners onto the corresponding non-solid model based on the definitions of the fasteners; determining intersections between the line segments and surfaces of the corresponding non-solid model; and redrawing the line segments between surface faces based on the intersections, the line segments as redrawn representing the fasteners in the corresponding non-solid model.

In some example implementations of the method of any preceding example implementation, or any combination of any preceding example implementations, parameterizing the EME model includes assigning electrical conductivity values to surfaces of corresponding non-solid model representing the component parts, and assigning electrical resistance values to line segments on the corresponding non-solid model representing the fasteners.

In some example implementations of the method of any preceding example implementation, or any combination of any preceding example implementations, parameterizing the EME model includes assigning one or more of electrical self-impedance, electrical mutual-impedance or electromagnetic shielding values to line segments on the corresponding non-solid model representing the electrical wiring.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

FIGS. 3, 4, 5, 6, 7 and 8 illustrate graphical user interfaces (GUIs), models and other graphical presentations according to some example implementations;

DETAILED DESCRIPTION

Figure 1:
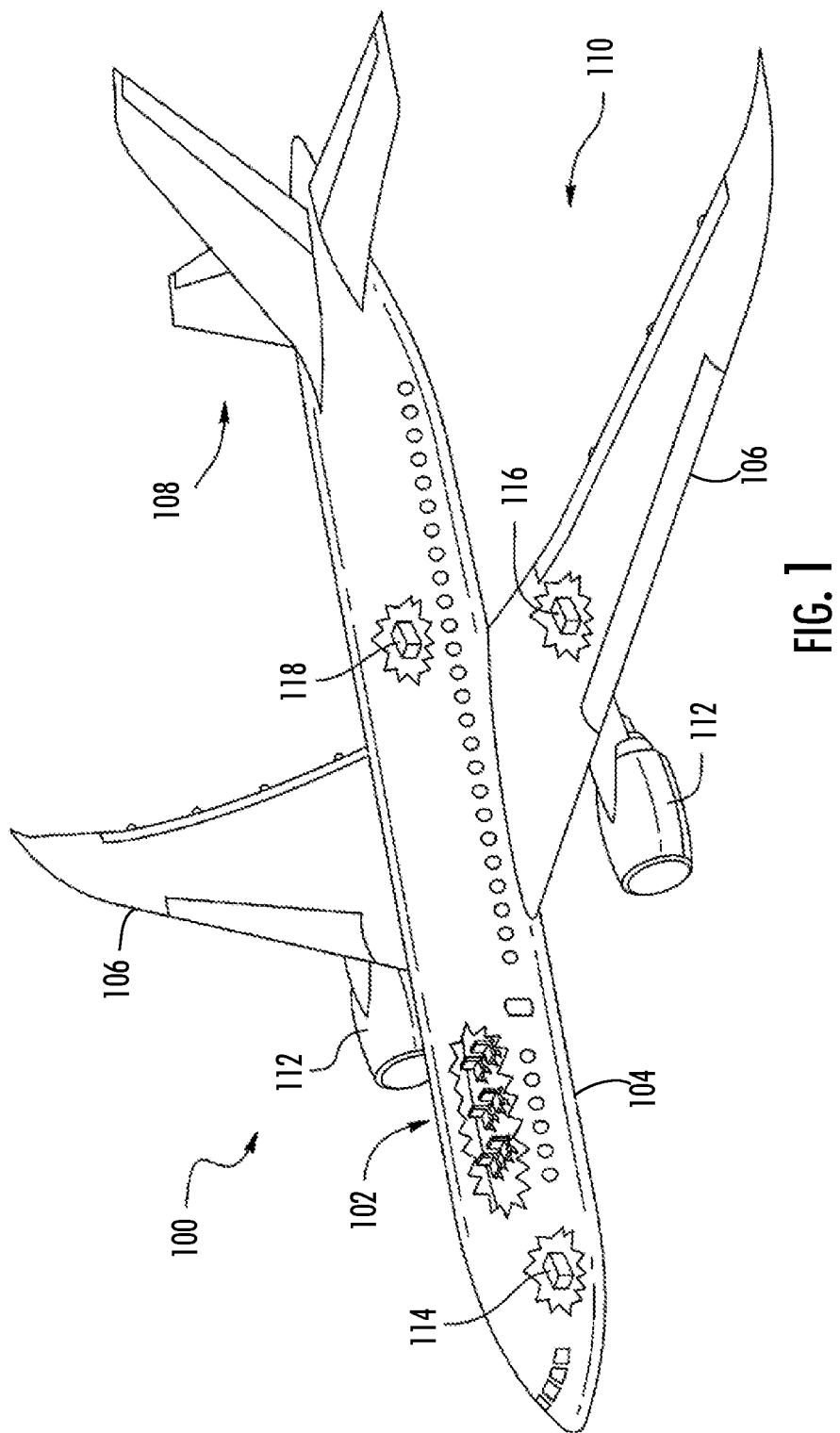
FIG. 1 illustrates an aircraft according to some example implementations of the present disclosure.

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless specified otherwise or clear from context, references to first, second or the like should not be construed to imply a particular order. A feature may be described as being above another feature (unless specified otherwise or clear from context) may instead be below, and vice versa; and similarly, features described as being to the left of another feature else may instead be to the right, and vice versa. As used herein, unless specified otherwise or clear from context, the "or" of a set of operands is the "inclusive or" and thereby true if and only if one or more of the operands is true, as opposed to the "exclusive or" which is false when all of the operands are true. Thus, for example, "[A] or [B]" is true if [A] is true, or if [B] is true, or if both [A] and [B] are true. Further, the articles "a" and "an" mean "one or more," unless specified otherwise or clear from context to be directed to a singular form. Like reference numerals refer to like elements throughout.

Example implementations of the present disclosure relate generally to designing and manufacturing a structural product, and in particular, to an integrated development environment to establish a digital thread in the lifecycle of a structural product. While example implementations will be primarily described in conjunction with an aircraft, it should be understood that example implementations may be utilized in conjunction with a variety of other structural products. Examples of suitable structural products that may benefit from example implementations include vehicles such as rotorcraft, spacecraft, watercraft, motor vehicles, railed vehicles and the like. Other examples of suitable structural products include satellites (artificial satellites), fuel transport systems, manufacturing facility and equipment, missiles, laboratory test fixtures, and the like. The electrostatics problem may also be present in agriculture, where dust from grain holding tanks can ignite in the presence of static sparking. Furthermore, it should be understood that unless otherwise specified, the terms "data," "content," "digital content," "information," and similar terms may be at times used interchangeably. Similarly, the terms "maintenance" and "repair" may be at times used interchangeably.

Example implementations of the present disclosure provide an integrated development environment to establish a digital thread in the lifecycle of a structural product such as an aircraft or other vehicle. The integrated development environment of example implementations leverages model-based approaches to electromagnetic effects (EME) modeling that are more traceable, accurate, reusable and efficient. The integrated development environment may guide a modeler through an entire EME modeling workflow, and provide tools to access and transform authoritative data for the structural product and transform it into an EME model per the requirements of a given analysis. Further, the integrated development environment may automate challenging aspects of creating an EME model, and use guided tutorials with images to walk the modeler through some operations to create the EME model. The EME model may be preconditioned improved meshing and run-time in computational solvers. Health checks may assess whether modeling best practices are followed at various checkpoints to ensure first time quality, and results from various simulations may be aggregated and visualized to perform trades and product-level assessments.

FIG. 1 illustrates one type of aircraft 100 that may benefit from example implementations of the present disclosure. As shown, the aircraft includes an airframe 102 with a fuselage 104, wings 106 and tail 108. The aircraft also includes a plurality of high-level systems 110 such as a propulsion system. In the particular example shown in FIG. 1, the propulsion system includes two wing-mounted engines 112. In other embodiments, the propulsion system can include other arrangements, for example, engines carried by other portions of the aircraft including the fuselage and/or the tail. The high-level systems may also include an electrical system 114, hydraulic system 116 and/or environmental system 118. Any number of other systems may be included.

Figure 2:
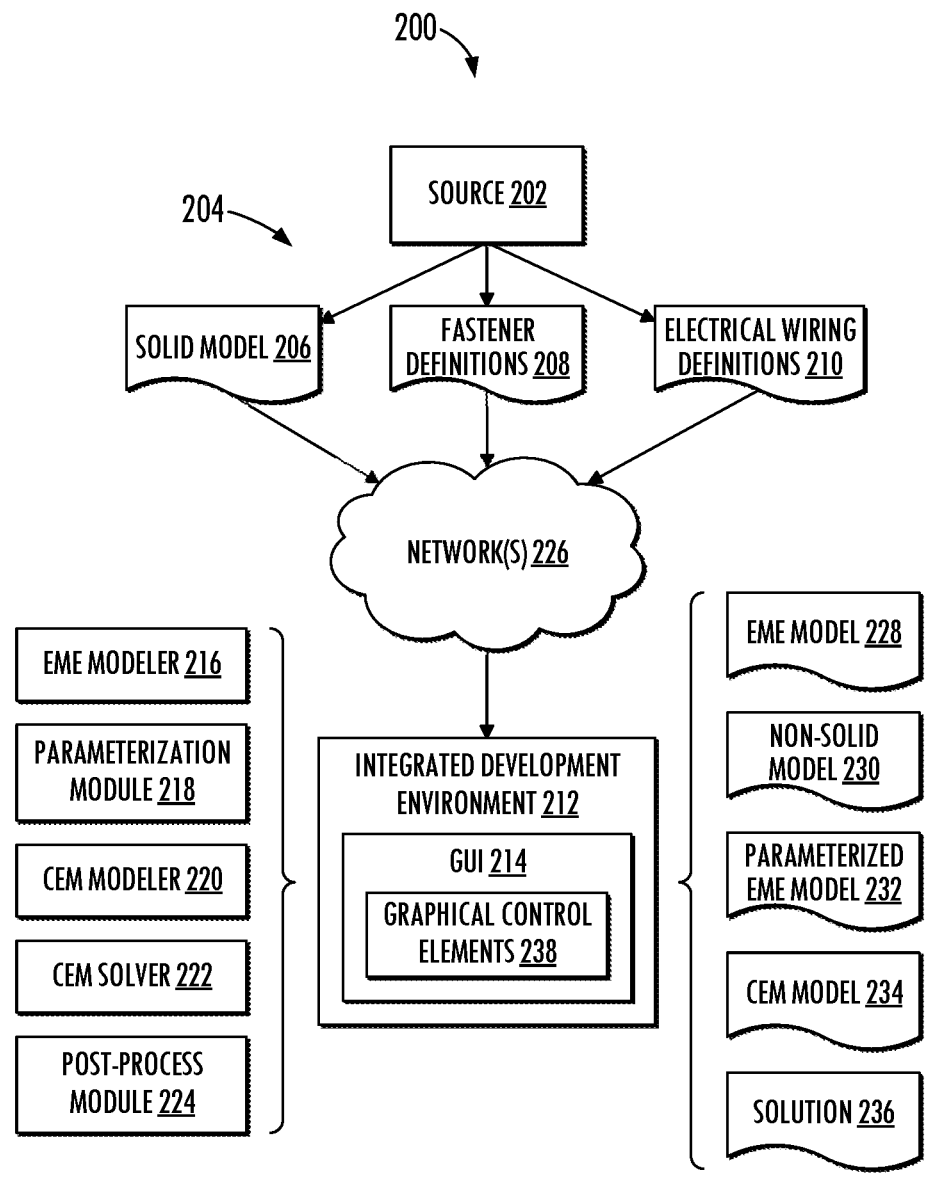
FIG. 2 illustrates a system for designing a structural product such as an aircraft, according to some example implementations.

FIG. 2 illustrates a system 200 for a system for designing a structural product such as an aircraft like the aircraft 100 of FIG. 1, according to some example implementations. The system may include any of a number of different subsystems, tools and the like (each an individual system) for performing one or more functions or operations. As shown, in some examples, the system includes at least one source 202 of authoritative data 204 for the structural product. In some examples, the source includes a memory that may be located at a single source or distributed across multiple sources. The authoritative data may be stored in a number of different manners, such as in a database or flat files of any of a number of different types or formats. More particularly, for example, the authoritative data may be stored in a product lifecycle management (PLM) solution, product data management (PDM) solution or the like, which may be hosted on at least one source.

In some examples, a structural product includes component parts joined by fasteners, and an installation of electrical wiring. In some of these examples, then, the authoritative data 204 includes a solid model 206 of the structural product, definitions 208 of the fasteners, and definitions 210 of the electrical wiring. At least some of the authoritative data may be produced by a solid modeler using a commercially-available computer-aided design (CAD) system, such as CATIA, SolidWorks or the like, available from Dassault Systèmes S.A. of Vélizy-Villacoublay, France. The solid model of the structural product may include a three-dimensional (3D) geometry model of the structural product. The solid model may include, identify or reference at least some engineering data for manufacturing the structural product. This engineering data may include the definitions of the fasteners and electrical wiring 208, 210.

The system 200 of example implementations of the present disclosure includes an integrated development environment 212 to establish a digital thread in a lifecycle of the structural product, which may be computer-implemented and thereby accessible from a graphical user interface (GUI) 214. The integrated development environment may include or otherwise be coupled to subsystems, tools or the like to establish the digital thread in the lifecycle of the structural product. As shown, for example, the integrated development environment may include or otherwise be coupled to an EME modeler 216, a parameterization module 218, a computational electromagnetics (CEM) modeler 220, a CEM solver 222 and/or a post-process module 224.

The subsystems, tools and the like of the system 200, including the source(s) 202, integrated development environment 212, EME modeler 216, parameterization module 218, CEM modeler 220, CEM solver 222 and post-process module 224, may be co-located or directly coupled to one another. In some examples, various ones of the subsystems, tools and the like may communicate with one another across one or more computer networks 226. Further, although shown as part of the system, it should be understood that any one or more of the subsystems, tools and the like may function or operate as a separate system without regard to any of the other subsystems, tools and the like. It should also be understood that the system may include one or more additional or alternative subsystems, tools and the like than those shown in FIG. 2.

According to some example implementations of the present disclosure, the integrated development environment 212 is accessible from the GUI 214 to access a source 202 of authoritative data 204 for the structural product, including a solid model 206 of the structural product, definitions 208 of the fasteners, and definitions 210 of the electrical wiring. Likewise, the integrated development environment is accessible from the GUI to also access the EME modeler 216, parameterization module 218, CEM modeler 220, CEM solver 222 and post-process module 224. As described in greater detail below, in some examples, the GUI includes a plurality of graphical control elements 238 arranged to guide a user through the integrated development environment. These may include graphical control elements that are user-selectable to access the EME modeler, parameterization modeler, CEM modeler, CEM solver and/or post-process module.

The EME modeler 216 is configured to generate an EME model 228 of the structural product from the authoritative data 204. In this regard, the EME modeler is configured to defeature the solid model 206 to generate a corresponding non-solid model 230 of the structural product. The non-solid model is a more simplified geometric model than the solid model. In this regard, the EME modeler may be configured to reduce the solid model to a surface model, a model comprised of curves or some combination of surfaces and curves, or the like. That is, the non-solid model may be a surface model, a model comprised of curves, a model comprised of surfaces and curves, or the like.

In some examples, distinct EME threats have respective model requirements. At least in examples in which the structural product is an aircraft, these distinct EME threats may include lightning direct effects (LDE), indirect effects of lightning, high-intensity radiated fields (HIRF), refueling electrostatics, aircraft-level lightning attachment zoning, and the like. In some of these examples, the EME modeler 216 is configured to receive user-selection of an EME threat from the distinct EME threats, and defeature the solid model 206 according to the respective model requirements of the EME threat. Additionally or alternatively, in some examples, the integrated development environment 212 provides distinct types of the component parts associated with methods of defeaturing, and at least some of the methods of defeaturing are different for different ones of the distinct types of the component parts. For an aircraft, these distinct types of the component parts may include component parts for distinct sections of the aircraft such as Section 11 (center wing tank), Section 12 (outboard wing), the side-of-body (or wing-body join), and the like. In some of these examples, the EME modeler is configured to user-selection of a type of component part from the distinct types of the component parts, and defeature those of the component parts of the type of component part according to a method of the methods associated therewith.

The EME modeler 216 is configured to draw the fasteners onto the corresponding non-solid model 230 based on the definitions 208 of the fasteners, and draw the electrical wiring onto the corresponding non-solid model based on the definitions 210 of the electrical wiring. In some examples, the EME modeler is further configured to sub-grid one or more surfaces of the corresponding non-solid model to generate a larger number of corresponding smaller surfaces.

In some examples, the EME modeler 216 configured to draw the fasteners includes the EME modeler configured to draw line segments for the fasteners onto the corresponding non-solid model 230 based on the definitions 208 of the fasteners. In these examples, the EME modeler is configured to determine intersections between the line segments and surfaces of the corresponding non-solid model, and redraw the line segments between surface faces based on the intersections, the line segments as redrawn representing the fasteners in the corresponding non-solid model.

The parameterization module 218 is configured to parameterize the EME model 228 with one or more electrical properties of the component parts of the structural product, the fasteners and the electrical wiring, and thereby produce a parameterized EME model 232. In some examples, this includes the parameterization module configured to assign electrical conductivity values to surfaces of corresponding non-solid model 230 representing the component parts, and assign electrical resistance values to line segments on the corresponding non-solid model representing the fasteners. Additionally or alternatively, in some examples, the parameterization module is configured to assign one or more of electrical self-impedance, electrical mutual-impedance or electromagnetic shielding values to line segments on the corresponding non-solid model representing the electrical wiring.

The CEM modeler 220 is configured to produce a CEM model 234 of the structural product from the parameterized EME model 232. CEM is known as a modeling of the interaction of electromagnetic fields with physical objects and the environment. Examples of suitable CEM models include a finite-difference time-domain (FDTD) model, method of moments (MOM) model, finite element method (FEM) model and the like. Other examples of suitable models include those for analyses such as asymptotic high-frequency method analyses (e.g., ray-tracing, uniform geometrical theory of diffraction, geometrical theory of diffraction), electrostatics, electro-hydrodynamics (EHD) (e.g., refueling situation), two-dimensional (2D) multi-wire transmission line analyses and the like. The CEM modeler may be, include or otherwise benefit from proprietary software and/or commercially-available software. Examples of suitable commercially-available software includes Altair Hyper-View and FEKO, both available from Altair Engineering, Inc.; the ANSYS software suite (including HFSS), available from ANSYS, Inc. of Canonsburg, Pa.; COMSOL Multiphysics® (FEMLAB), available from COMSOL Inc. of Burlington, Mass.; the CST Studio Suite and Simulia, both available from Simulia (a subsidiary of Dassault Systèmes); and the like.

In some examples, the CEM model 234 represents the component parts, the fasteners and the electrical wiring by a mesh of elements. The elements may be or include one or more disjointed (non-overlapping) components of a mathematical model in which each element may possess a set of distinguishing points called nodal points or nodes. The CEM model may in turn include a nodal dataset for each set of nodal points, which may include values of a property or state of the structural product at respective nodal points of the set of nodal points. Examples of suitable properties include geometric properties and constitutive properties, and more particularly; electrical properties such as those from the parameterized EME model.

The CEM solver 222 is configured to perform a CEM analysis in which the CEM model 234 of the structural product is exposed to a simulated EME threat to predict an impact of a corresponding EME threat on the structural product. Examples of suitable CEM analyses include FDTD analysis, MOM analysis, FEM analyses and the like. Other examples of suitable analyses include asymptotic high-frequency method analyses (e.g., ray-tracing, uniform geometrical theory of diffraction, geometrical theory of diffraction), electrostatics, EHD (e.g., refueling situation), 2D multi-wire transmission line analyses and the like.

From the CEM analysis, the CEM solver 222 is configured to generate a corresponding solution 236, and the post-process module 224 is configured to post-process the corresponding solution. The post-process module may be configured to check the validity of the corresponding solution; and in some examples, the post-process module may to perform at least one other appropriate analysis on the CEM model and/or the corresponding solution. In some examples, the corresponding solution and/or one or more post-process artifacts from the post-process module may be passed back to the source 202 for storage with the authoritative data 204. The CEM solver and/or post-process module may be, include or otherwise benefit from proprietary software and/or commercially-available software. Examples of suitable commercially-available software includes the Abaqus Unified FEA product suite, available from Simulia; Altair HyperView; the ANSYS software suite; the CATIA; COMSOL Multiphysics® (FEMLAB); CST Studio Suite; FEKO, LS-DYNA®, available from Livermore Software Technology Corporation (LSTC) of Livermore, Calif.; Mathcad, available from PTC, Inc. of Boston, Mass.; MATLAB®, available from MathWorks of Natick, Mass.; NASTRAN/PATRAN, available from MSC Software Corporation; NX (Unigraphics), available from Siemens PLM Software of Plano, Tex.; SolidWorks; and the like.

Figure 3:
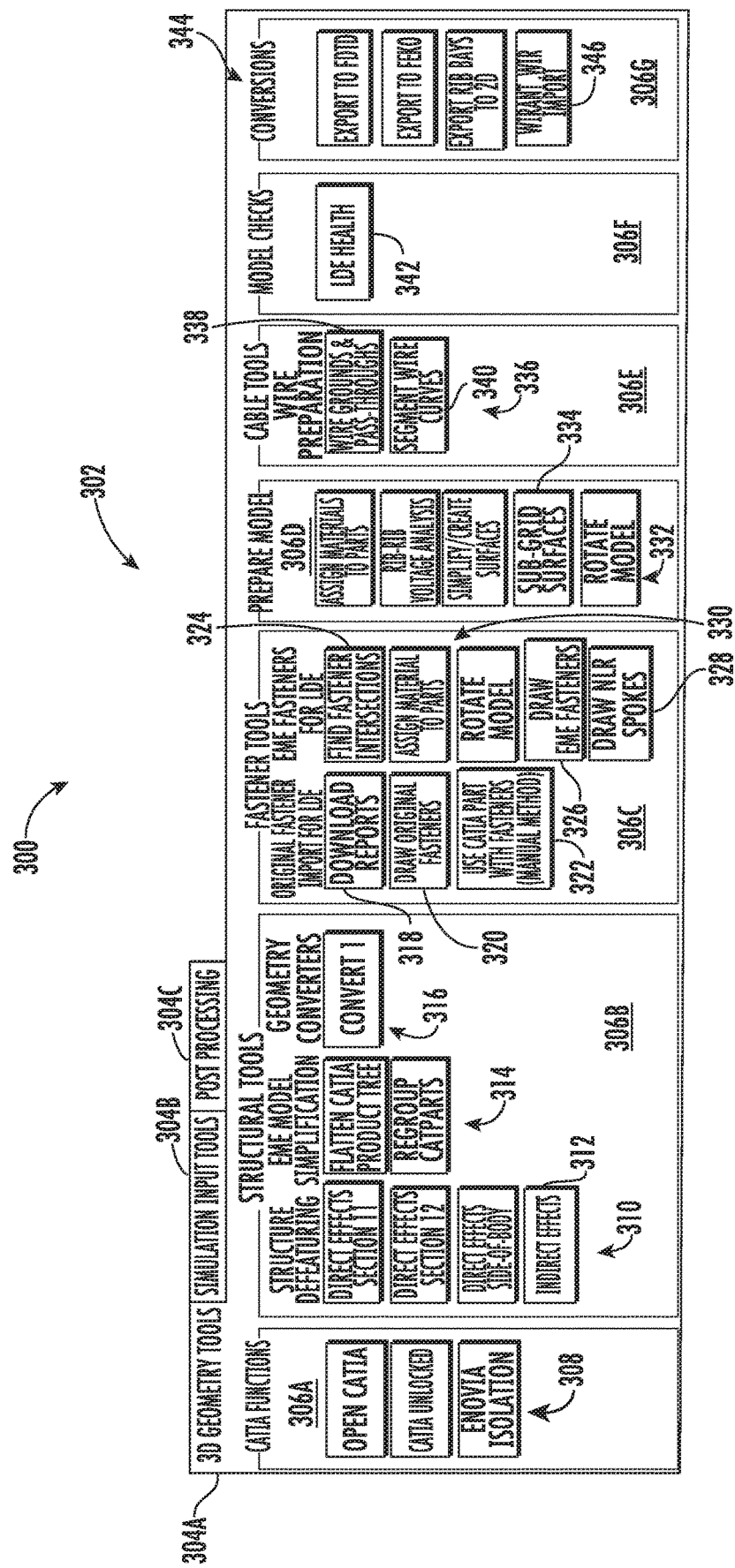

FIG. 3 illustrates a GUI 300 that may correspond to GUI 214 in some examples in which the structural product is an aircraft. The GUI includes a plurality of graphical control elements 302 (e.g., graphical control elements 238) that are user-selectable to access subsystems, tools or the like to establish the digital thread in the lifecycle of the aircraft. In some examples, the graphical control elements may be user-selectable to launch a respective subsystem, module or the like for a specific task or operation in establishment of the digital thread.

As shown, in some examples, the graphical control elements 302 are arranged to guide a user through the integrated development environment. In particular, for example, the graphical control elements are organized in tabs 304A, 304B and 304C for respectively pre-processing (3D Geometry Tools), processing (Simulation Input Tools) and post-processing (Post Processing) operations, and the graphical control elements shown for pre-processing are organized in frames 306A, 306B, 306C, 306D, 306E, 306F and 306G. These categories include CAD Functions, Structural Tools, Fastener Tools, Prepare Model, Cable Tools, Model Checks and Conversions.

The frame 306A for CAD Functions (shown as CATIA Functions) may include graphical control elements 308 from which a CAD system may be opened (Open CATIA) or interacted with while another tool is open (CATIA Unlocked), and/or from which a CAD product may be pulled from a PLM solution like Enovia and saved in an isolated product (Enovia Isolation).

In the frame 306B for Structural Tools, for example, the GUI 300 may include graphical control elements 310 from which the EME modeler 216 may be accessed to defeature the solid model 206 to generate a corresponding non-solid model 230 of the structural product. In some examples in which distinct EME threats have respective model requirements, and distinct types of the component parts are associated with methods of defeaturing, the graphical control elements for Structural Tools may include respective graphical control elements to enable user-selection of an EME threat and/or a type of component part from the distinct types of the component parts. As shown, for example, the graphical control elements include respective graphical control elements to enable user-selection of an LDE threat for component parts in Section 11 (Direct Effects Section 11), component parts in Section 12 (Direct Effects Section 12), and side-of-body (Direct Effects Side-of-Body). The graphical control elements also include a respective graphical control element 312 for indirect effects of lightning (Indirect Effects).

Figure 4:
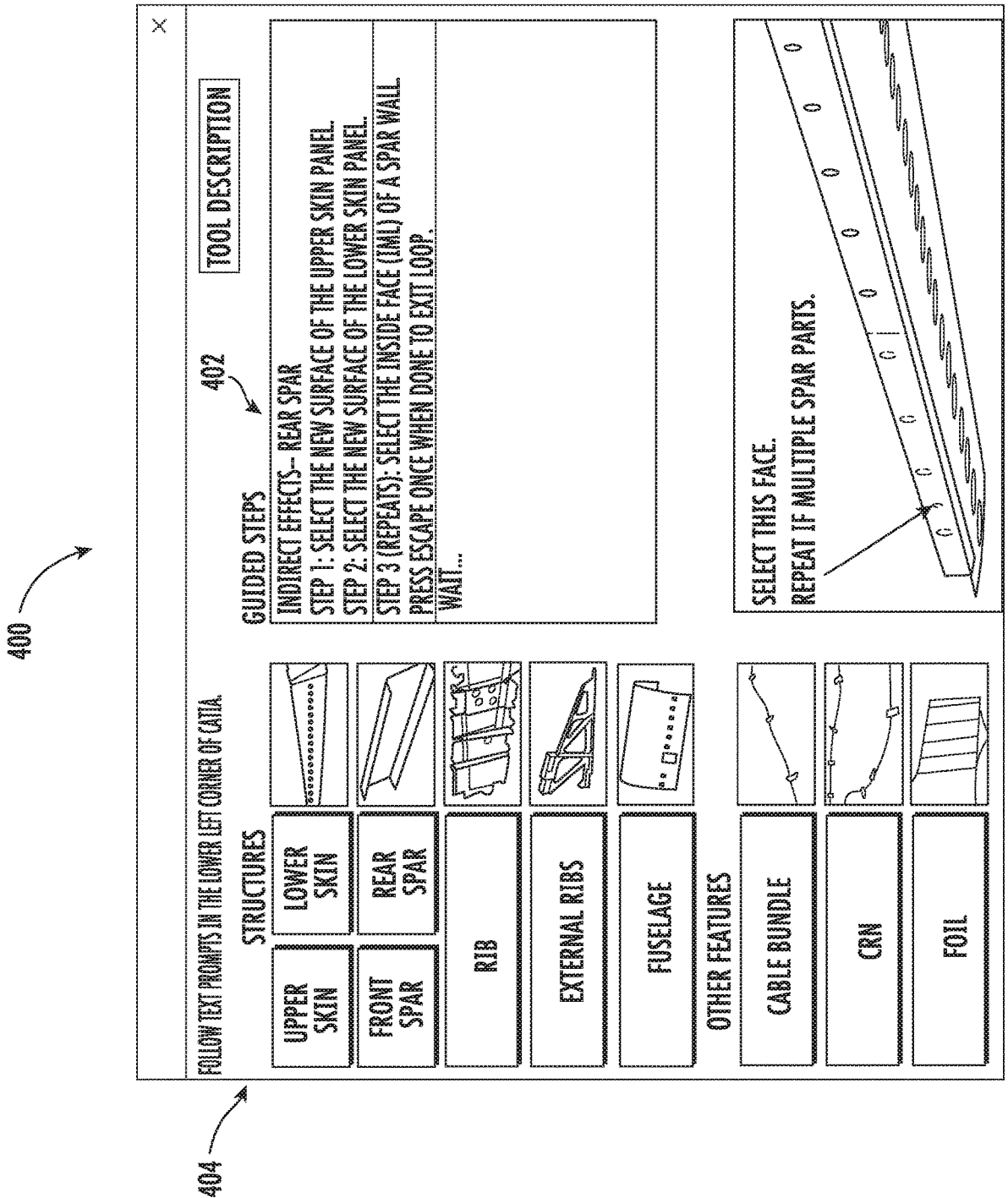

FIG. 4 illustrates a GUI 400 for the EME modeler 216 that may be launched on user-selection of the graphical control element 312 for Indirect Effects. This GUI includes text prompts (Guided Steps) 402 to guide the user through defeaturing component parts and/or other features of the aircraft in an appropriate solid modeler such as CATIA. These component parts (e.g., Upper Skin, Lower Skin, Front Spar, Rear Spar, Rib, External Ribs, Fuselage) and/or other features (e.g., Cable Bundle, CRN—Current Return Network, Foil) may be user-selected within the GUI from respective graphical control elements 404.

In the frame 306B for Structural Tools, for example, the GUI 300 may also include graphical control elements 314 and 316 from which a respective subsystem, module or the like may be launched to simplify the EME model 228 or otherwise pre-condition it for mesh and solver efficiency. The EME model may be simplified in any of a number of manners. In this regard, the graphical control elements may include a respective graphical control element (Flatten CATIA Product Tree) to launch a subsystem, module or the like to flatten the EME model, or more particularly the corresponding non-solid model 230. Another graphical control element (Regroup CATParts) may launch a subsystem, module or the like to combine user-selected component part instances in the EME model (corresponding non-solid model). Yet another graphical control element (Convert 1) may launch a subsystem, module or the like to convert geometry of the corresponding non-solid model from one format (e.g., a proprietary format) to another format suitable for operations.

In the frame 306C for Fastener Took, the GUI 300 may include, for example, a graphical control element 318 (Download Reports) from which a respective subsystem, module or the like may be launched to import the definitions 208 of the fasteners. A graphical control element 320 from which the EME modeler 216 may be launched to draw line segments for the fasteners onto the corresponding non-solid model 230 based on the definitions of the fasteners. Another graphical control element 322 (Use CATIA Part with Fasteners (Manual Method)) may be selected to launch instructions on how to create an original CAD product from parts or products otherwise received.

Figure 5:
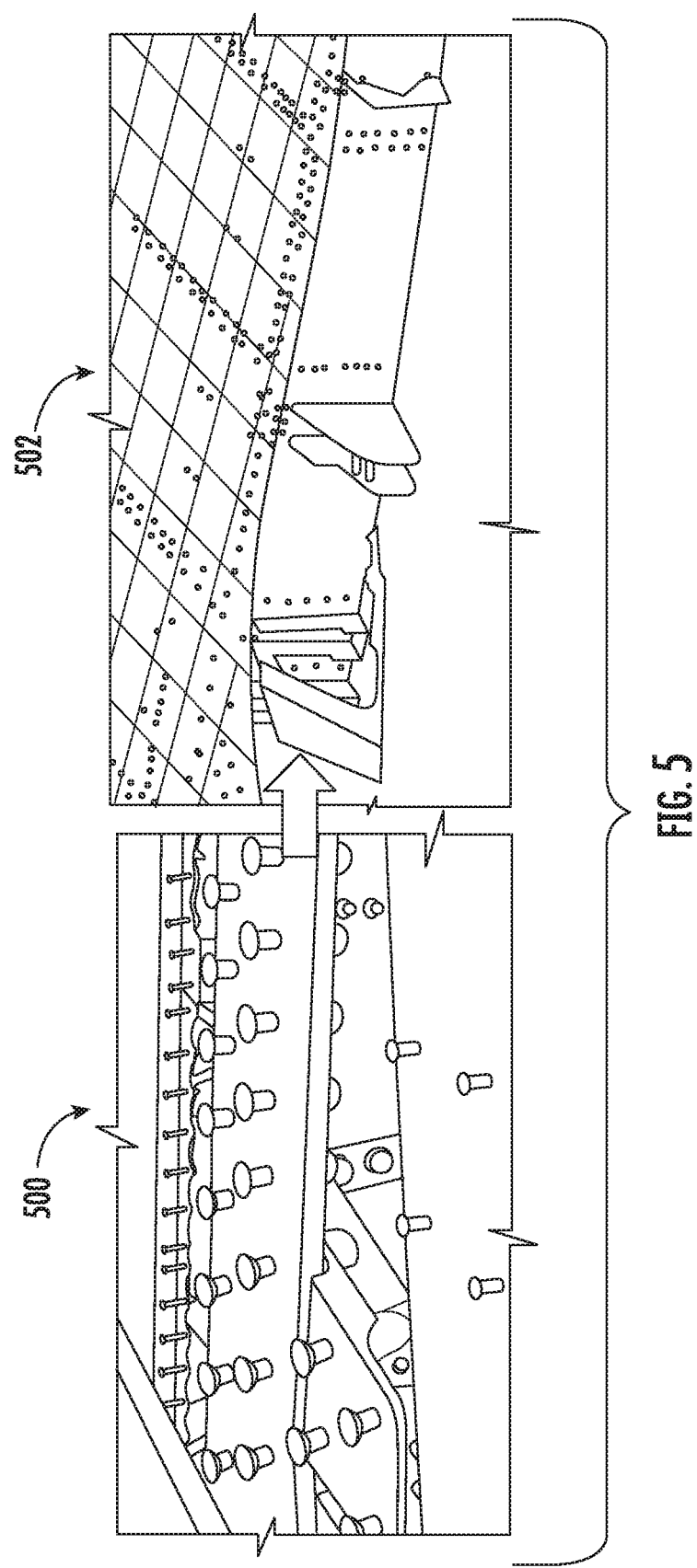

Graphical control element 324 (Find Fastener Intersections) and graphical control element 326 (Draw EME Fasteners) may in turn cause the EME modeler to determine intersections between the line segments and surfaces of the corresponding non-solid model, and redraw the line segments between surface faces based on the intersections (the redrawn line segments representing the fasteners). FIG. 5 illustrates a portion of a solid model 500 (e.g., solid model 206) including fasteners, and a portion of the corresponding non-solid model 502 (e.g., non-solid model 230) including line segments redrawn to represent the fasteners.

In the frame 306C for Fastener Tools, for example, the GUI 300 may also include a graphical control element 328 (Draw NLR Spokes) to cause the EME modeler to create radial lines from the end of a fastener, extending into the structural surface. These lines may be used to apply non-linear resistances (NLRB) representative of nonlinear behaviors in composite conductivity and in fastener contact impedances. Further graphical control elements 330 may be selected to assign material to parts in the EME model 228 (Assign Material to Parts), and rotate the EME model (Rotate Model)

Figure 6:
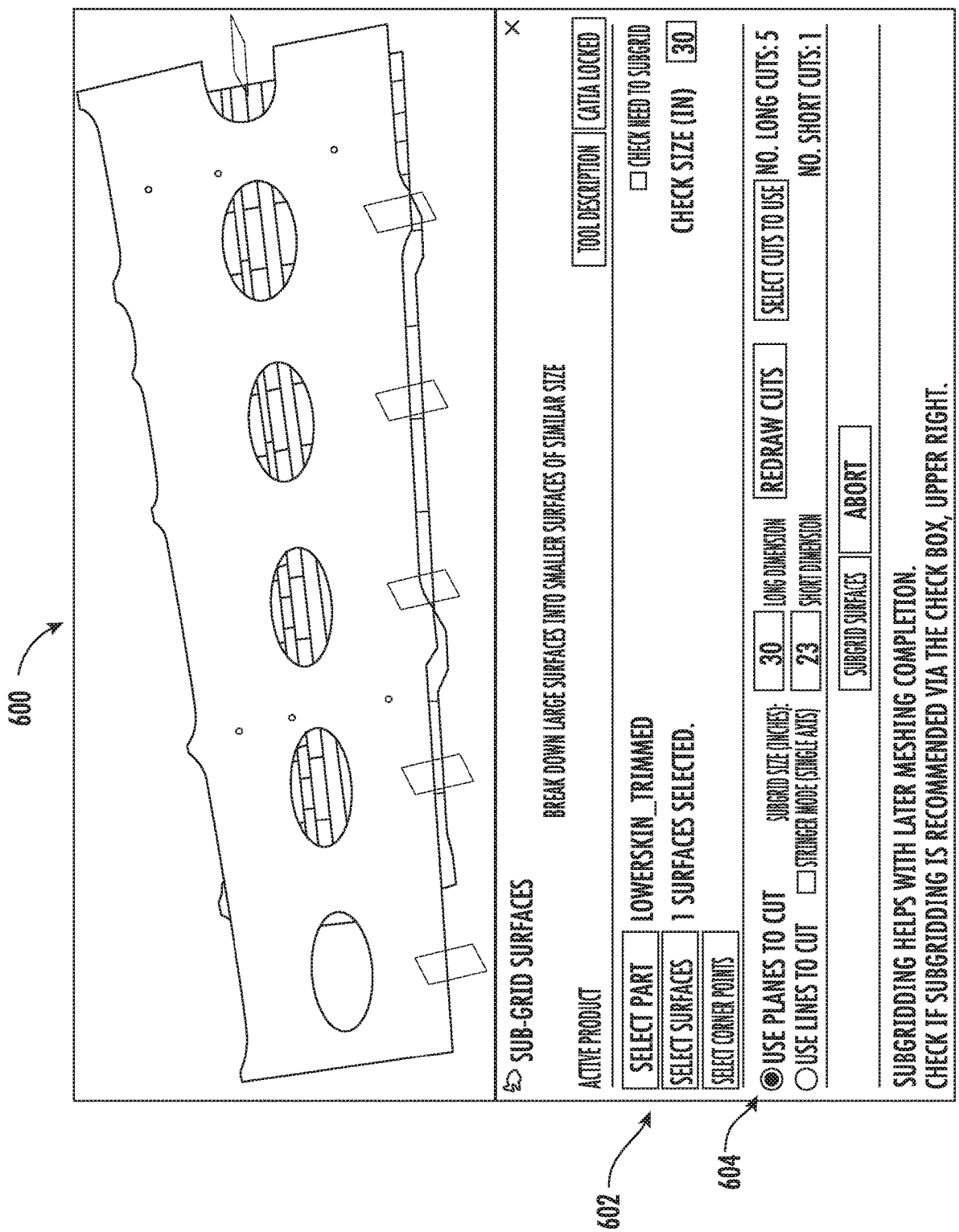

In the frame 306D for Prepare Model, the GUI 300 may include, for example, graphical control elements 332 to further prepare the EME model 228, such as to assign materials to parts, create lines between wing ribs for voltage analysis (Rib-Rib Voltage Analysis), simplify/create surfaces, rotate the EME model, or the like. These graphical control elements may also include, for example, a graphical control element 334 (Sub-Grid Surfaces) from which the EME modeler 216 may be launched to sub-grid one or more surfaces of the corresponding non-solid model 230 to generate a larger number of corresponding smaller surfaces. In this regard, FIG. 6 illustrates a GUI 600 for the EME modeler 216 that may be launched on user-selection of the graphical control element for Sub-Grid Surfaces. This GUI includes graphical control elements 602 from which a user may select a component part (Select Part) and surfaces to sub-grid (Select Surfaces), and select corner points (Select Corner Points) to define direction of cutting lines or planes in two directions. Other graphical control elements 604 are user-selectable to define parameters of the sub-grid operation such as use of planes or lines to cut, sub-grid size and the like.

Figure 7:
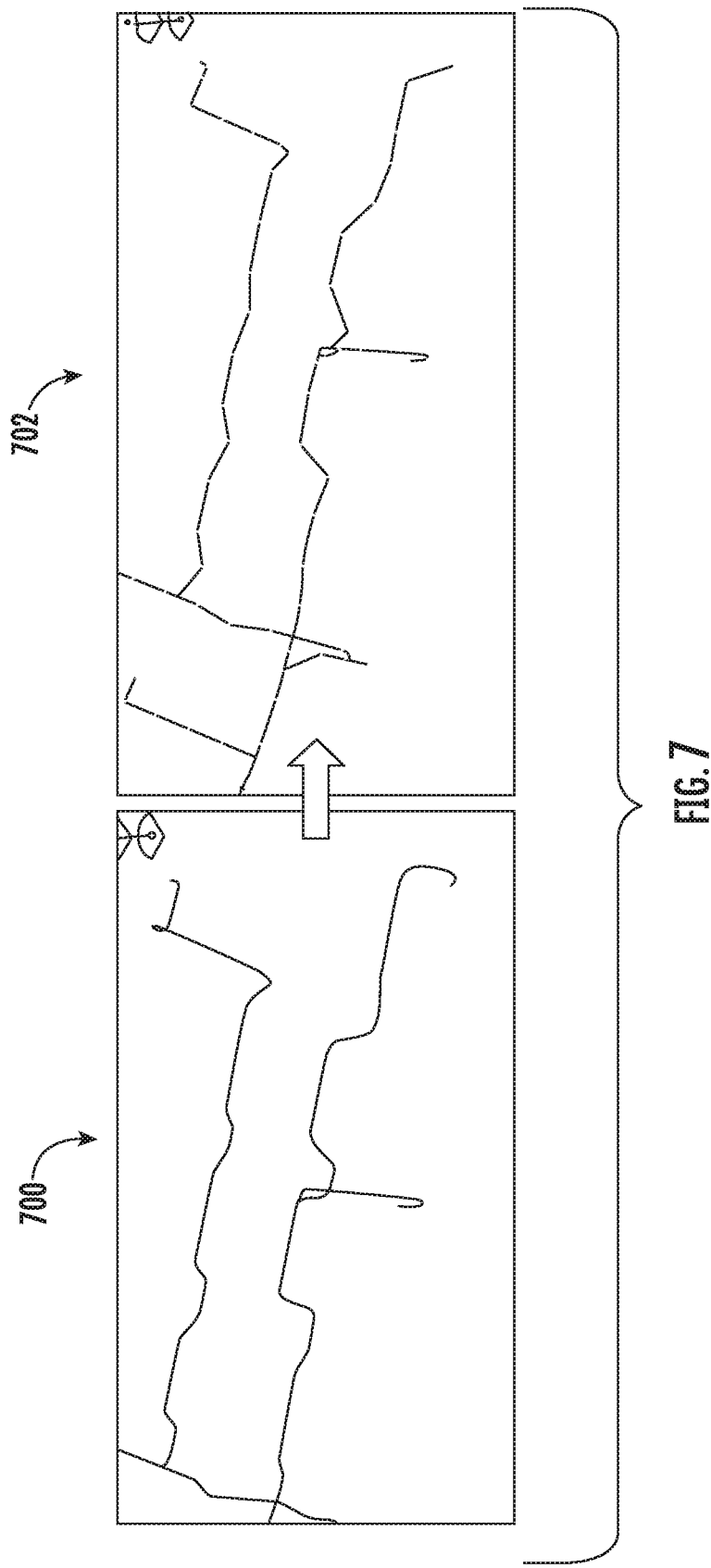

In the frame 306E for Cable Tools, the GUI 300 may include graphical control elements 336 from which the EME modeler 216 may be launched or otherwise caused to draw the electrical wiring onto the corresponding non-solid model 230 based on the definitions 210 of the electrical wiring. These graphical control elements may include a graphical control element 338 (Wire Grounds & Pass-Throughs) to set wire-to-structure ground points or holes for wires to pass through the structure. Another graphical control element 340 (Segment Wire Curves) may be user-selected to cause the EME modeler to simplify thin wire curves that represent wire bundles into piecewise-linear segments. FIG. 7 illustrates a portion of a cable harness 700, and the corresponding portion of the cable harness 702 segmented into piecewise-linear segments.

In the frame 306F for Model Checks, the GUI 300 may include graphical control elements to perform one or more checks of the EME model 228. These may include, for example, a graphical control element 342 (LDE Health) from which a respective subsystem, module or the like may be launched to run a user-selectable set of checks and measurements on the EME model to help identify if the model complies with the structure and format for conversion to the CEM model 234. Some of these checks may be embedded within others of the subsystems, modules or the like but aggregated here to provide full insight into readiness of the EME model. FIG. 8 illustrates a GUI 800 for the respective subsystem, module or the like from which the user may select the set of checks and measurements, and view results of the checks and measurements.

In the frame 306G for Conversions, the GUI 300 may include graphical control elements 344 from which the CEM modeler 220 may be launched to produce a CEM model 234 of the structural product from the parameterized EME model 232. In some examples, this may be integrated with launch of the CEM solver to 222 to perform the CEM analysis. Examples include graphical control elements for different commercially-available software usable to produce the CEM model (Export to FDTD. Export to FEKO). Another example includes graphical control elements for particular aspects of the aircraft or other structural product (Export Rib Bays to 2D). In addition, in some examples, the frame 306G for Conversions may include one or more graphical control elements 346 to read in geometry from commercially-available software such as Xpedition® Enterprise from Mentor (WIRANT.WIR Import) for electrical wiring.

Although not separately shown, the tab 304B for Simulation Input Tools may include one or more graphical control elements from which the parameterization module 218 may be accessed. In this regard, these graphical control elements may be user-selected to launch the parameterization module to parameterize the EME model 228 with one or more electrical properties of the component parts of the structural product, the fasteners and the electrical wiring, and thereby produce a parameterized EME model 232. The tab 304C for Post Processing may likewise include one or more graphical control elements from which the post-process module 224 may be accessed. From here, the graphical control elements may be user-selected to launch the post-process module to post-process the corresponding solution generated by the CEM solver 222.

FIGS. 9A, 9B, 9C, 9D and 9E are flowcharts illustrating various steps in a method 900 of designing a structural product that includes component parts joined by fasteners, and an installation of electrical wiring, according to example implementations of the present disclosure. The method includes storing in memory computer-readable program code for an integrated development environment to establish a digital thread in a lifecycle of the structural product, as shown at block 902 of FIG. 9A. The method includes executing the computer-readable program code, via processing circuitry configured to access the memory, to cause an apparatus to generate a graphical user interface (GUI) from which the integrated development environment is accessible, as shown at block 904.

In particular, the integrated development environment is accessible for accessing a source of authoritative data for the structural product, and generating an electromagnetic effects (EME) model of the structural product from the authoritative data, as shown at blocks 906 and 908. The authoritative data includes a solid model of the structural product, definitions of the fasteners, and definitions of the electrical wiring. In this regard, generating the EME model includes defeaturing the solid model to generate a corresponding non-solid model of the structural product, as shown at block 910.

In some examples, distinct EME threats have respective model requirements. In some of these examples, defeaturing the solid model includes receiving user-selection of an EME threat from the distinct EME threats, and defeaturing the solid model according to the respective model requirements of the EME threat, as shown at blocks 910A and 910B of FIG. 9B. Additionally or alternatively, in some examples, the integrated development environment provides distinct types of the component parts associated with methods of defeaturing, and at least some of the methods of defeaturing are different for different ones of the distinct types of the component parts. In some of these examples, defeaturing the solid model includes receiving user-selection of a type of component part from the distinct types of the component parts, and defeaturing those of the component parts of the type of component part according to a method of the methods associated therewith, as shown at blocks 910C and 910D of FIG. 9C.

Returning to FIG. 9A, generating the EME model also includes drawing the fasteners onto the corresponding non-solid model based on the definitions of the fasteners, and drawing the electrical wiring onto the corresponding non-solid model based on the definitions of the electrical wiring, as shown at blocks 912 and 914. In some examples, generating the EME model further includes sub-gridding one or more surfaces of the corresponding non-solid model to generate a larger number of corresponding smaller surfaces, as shown at block 916.

Figure 9A:
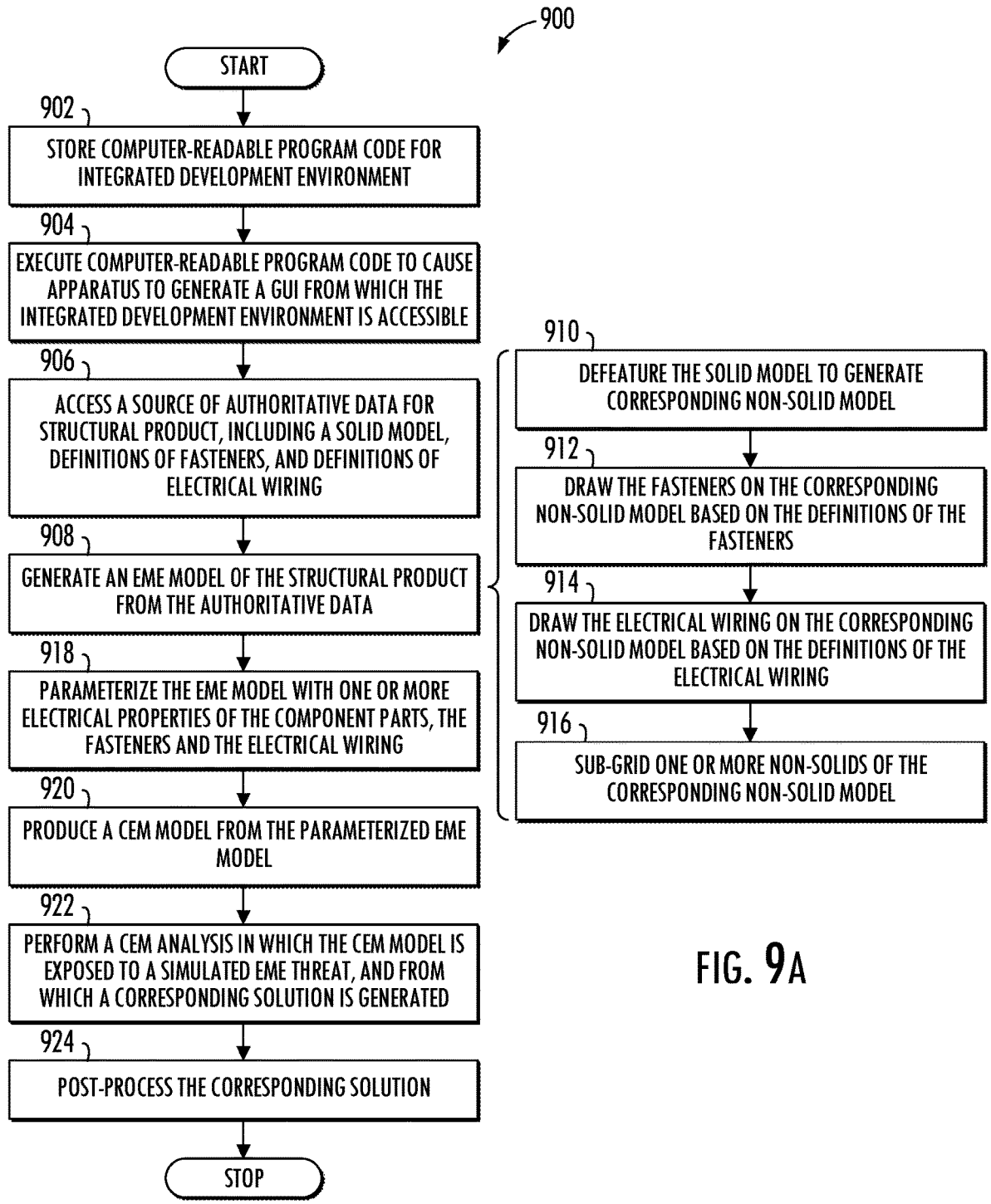
FIGS. 9A, 9B, 9C, 9D and 9E are flowcharts illustrating various steps in a method of designing a structural product such as an aircraft, according to example implementations.
Figure 9B:
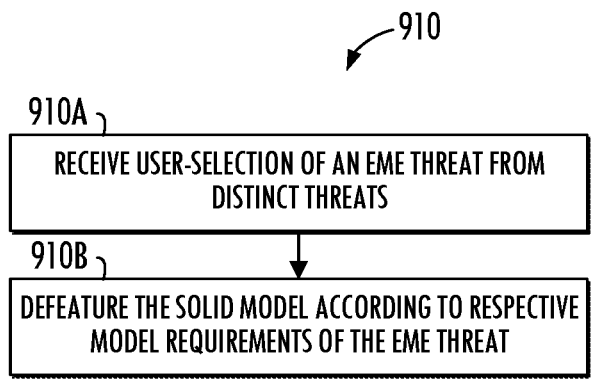
Figure 9C:
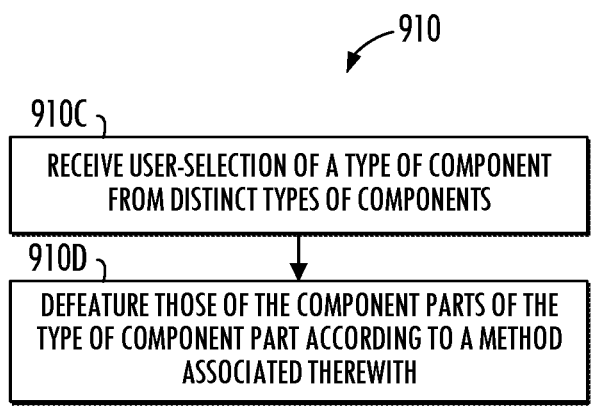
Figure 9D:
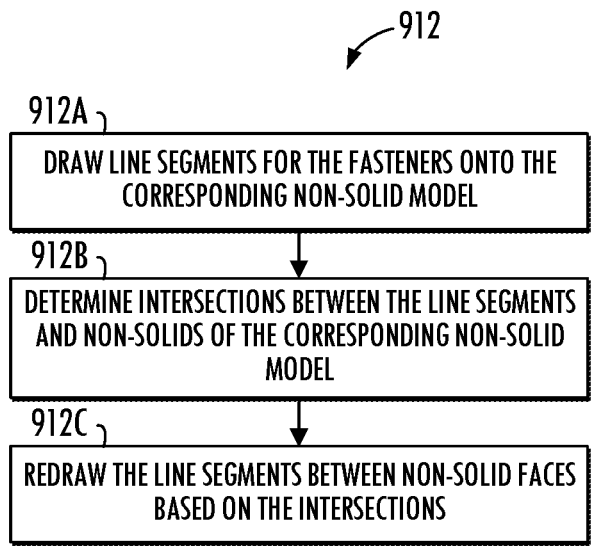
Figure 9E:
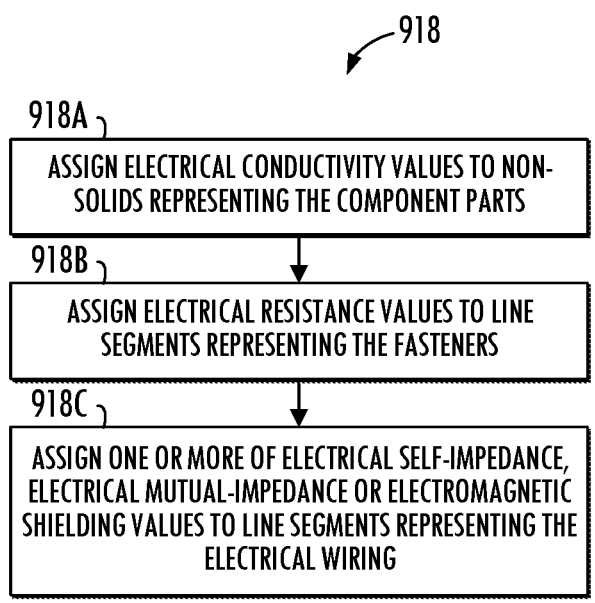

In some examples, drawing the fasteners includes drawing line segments for the fasteners onto the corresponding non-solid model based on the definitions of the fasteners, and determining intersections between the line segments and surfaces of the corresponding non-solid model, as shown at blocks 912A and 912B of FIG. 9D. Drawing the fasteners, then, further includes redrawing the line segments between surface faces based on the intersections, as shown at block 912C. Here, the line segments as redrawn represent the fasteners in the corresponding non-solid model.

As also shown in FIG. 9A, the integrated development environment is also accessible for parameterizing the EME model with one or more electrical properties of the component parts, the fasteners and the electrical wiring, and thereby producing a parameterized EME model, as shown at block 918. In some examples, this includes assigning electrical conductivity values to surfaces of corresponding non-solid model representing the component parts, and assigning electrical resistance values to line segments on the corresponding non-solid model representing the fasteners, as shown at blocks 918A and 918B of FIG. 9E. Additionally or alternatively, in some examples, parameterizing the EME model includes assigning one or more of electrical self-impedance, electrical mutual-impedance or electromagnetic shielding values to line segments on the corresponding non-solid model representing the electrical wiring, as shown at block 918C.

The integrated development environment is also accessible for producing computational electromagnetics (CEM) model of the structural product from the parameterized EME model, with the CEM model representing the component parts, the fasteners and the electrical wiring by a mesh of elements, as shown at block 920 of FIG. 9A. A CEM analysis is performed in which the CEM model of the structural product is exposed to a simulated EME threat to predict an impact of a corresponding EME threat on the structural product, and from which a corresponding solution is generated, as shown at block 922. The corresponding solution is then post-processed, as shown at block 924.

In some examples, the GUI includes a plurality of graphical control elements arranged to guide a user through the integrated development environment. The plurality of graphical control elements includes graphical control elements that are user-selectable for generating the EME model (block 908), parameterizing the EME model (block 918), and producing the CEM model (block 920).

According to example implementations of the present disclosure, the system 200 and its subsystems, tools and the like, including the source 202, integrated development environment 212, EME modeler 216, parameterization module 218, CEM modeler 220, CEM solver 222 and post-process module 224, may be implemented by various means. Means for implementing the system and its subsystems may include hardware, alone or under direction of one or more computer programs from a computer-readable storage medium. In some examples, one or more apparatuses may be configured to function as or otherwise implement the system and its subsystems shown and described herein. In examples involving more than one apparatus, the respective apparatuses may be connected to or otherwise in communication with one another in a number of different manners, such as directly or indirectly via a wired or wireless network or the like.

Figure 10:
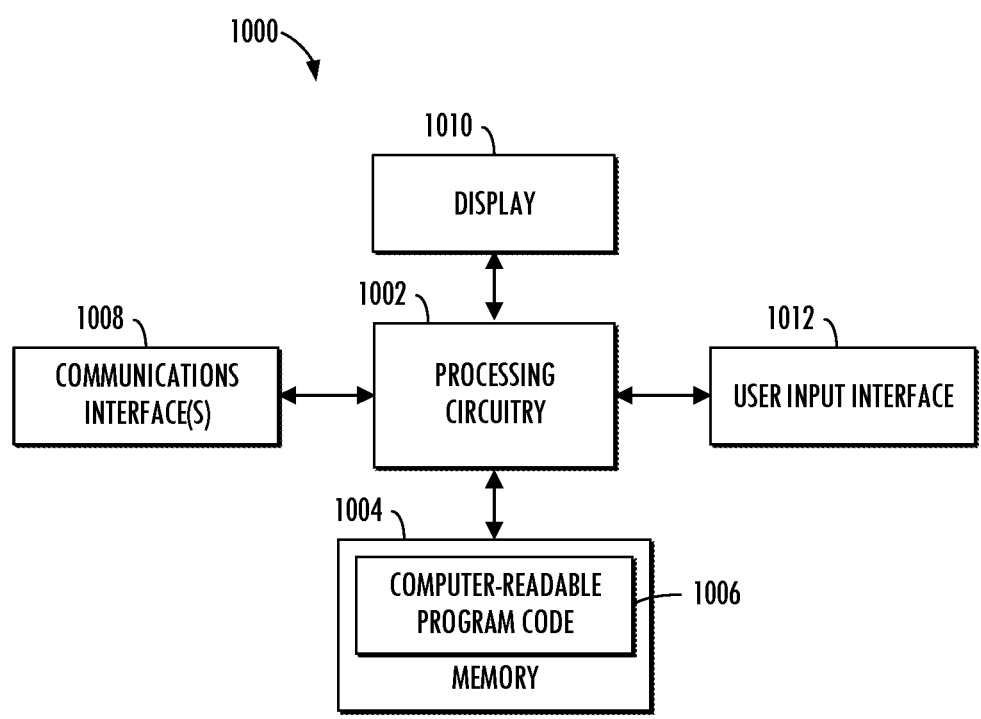
FIG. 10 illustrates an apparatus according to some example implementations.

FIG. 10 illustrates an apparatus 1000 according to some example implementations of the present disclosure. Generally, an apparatus of example implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, processing circuitry 1002 (e.g., processor unit) connected to a memory 1004 (e.g., storage device).

The processing circuitry 1002 may be composed of one or more processors alone or in combination with one or more memories. The processing circuitry is generally any piece of computer hardware that is capable of processing information such as, for example, data, computer programs and/or other suitable electronic information. The processing circuitry is composed of a collection of electronic circuits some of which may be packaged as an integrated circuit or multiple interconnected integrated circuits (an integrated circuit at times more commonly referred to as a "chip"). The processing circuitry may be configured to execute computer programs, which may be stored onboard the processing circuitry or otherwise stored in the memory 1004 (of the same or another apparatus).

The processing circuitry 1002 may be a number of processors, a multi-core processor or some other type of processor, depending on the particular implementation. Further, the processing circuitry may be implemented using a number of heterogeneous processor systems in which a main processor is present with one or more secondary processors on a single chip. As another illustrative example, the processing circuitry may be a symmetric multi-processor system containing multiple processors of the same type. In yet another example, the processing circuitry may be embodied as or otherwise include one or more ASICs, FPGAs or the like. Thus, although the processing circuitry may be capable of executing a computer program to perform one or more functions, the processing circuitry of various examples may be capable of performing one or more functions without the aid of a computer program. In either instance, the processing circuitry may be appropriately programmed to perform functions or operations according to example implementations of the present disclosure.

The memory 1004 is generally any piece of computer hardware that is capable of storing information such as, for example, data, computer programs (e.g., computer-readable program code 1006) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 1004, the processing circuitry 1002 may also be connected to one or more interfaces for displaying, transmitting and/or receiving information. The interfaces may include a communications interface 1008 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 1010 and/or one or more user input interfaces 1012 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by processing circuitry that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processing circuitry or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, an apparatus 1000 may include a processing circuitry 1002 and a computer-readable storage medium or memory 1004 coupled to the processing circuitry, where the processing circuitry is configured to execute computer-readable program code 1006 stored in the memory. It will also be understood that one or more functions, and combinations of functions, may be implemented by special purpose hardware-based computer systems and/or processing circuitry s which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. An apparatus for designing a structural product that includes component parts joined by fasteners, and an installation of electrical wiring, the apparatus comprising:
   a memory configured to store computer-readable program code for an integrated development environment to establish a digital thread in a lifecycle of the structural product; and
   processing circuitry configured to access the memory, and execute the computer-readable program code to cause the apparatus to generate a graphical user interface (GUI) from which the integrated development environment is accessible to cause the apparatus to at least:
   access a source of authoritative data for the structural product, the authoritative data including a solid model of the structural product, definitions of the fasteners, and definitions of the electrical wiring;
   generate an electromagnetic effects (EME) model of the structural product from the authoritative data, including the apparatus caused to:
      defeature the solid model to generate a corresponding non-solid model of the structural product;
      draw the fasteners onto the corresponding non-solid model based on the definitions of the fasteners; and
      draw the electrical wiring onto the corresponding non-solid model based on the definitions of the electrical wiring;
   parameterize the EME model with one or more electrical properties of the component parts, the fasteners and the electrical wiring, and thereby produce a parameterized EME model;
   produce a computational electromagnetics (CEM) model of the structural product from the parameterized EME model, the CEM model representing the component parts, the fasteners and the electrical wiring by a mesh of elements;
   perform a CEM analysis in which the CEM model of the structural product is exposed to a simulated EME threat to predict an impact of a corresponding EME threat on the structural product, and from which a corresponding solution is generated; and
   post-process the corresponding solution.

2. The apparatus of claim 1, wherein the GUI includes a plurality of graphical control elements arranged to guide a user through the integrated development environment, the plurality of graphical control elements including graphical control elements that are user-selectable to cause the apparatus to generate the EME model, parameterize the EME model, and produce the CEM model.

3. The apparatus of claim 1, wherein distinct EME threats have respective model requirements, and the apparatus caused to defeature the solid model includes the apparatus caused to receive user-selection of an EME threat from the distinct EME threats, and defeature the solid model according to the respective model requirements of the EME threat.

4. The apparatus of claim 1, wherein the integrated development environment provides distinct types of the component parts associated with methods of defeaturing, one or more of the methods of defeaturing being different for different ones of the distinct types of the component parts, and wherein the apparatus caused to defeature the solid model includes the apparatus caused to receive user-selection of a type of component part from the distinct types of the component parts, and defeature the component parts of the type of component part according to a method of the methods of defeaturing.

5. The apparatus of claim 1, wherein the apparatus caused to generate the EME model further includes the apparatus caused to sub-grid one or more surfaces of the corresponding non-solid model to generate a larger number of corresponding smaller surfaces.

6. The apparatus of claim 1, wherein the apparatus caused to draw the fasteners includes the apparatus caused to at least:

draw line segments for the fasteners onto the corresponding non-solid model based on the definitions of the fasteners;

determine intersections between the line segments and surfaces of the corresponding non-solid model; and redraw the line segments between surface faces based on the intersections, the line segments as redrawn representing the fasteners in the corresponding non-solid model.

7. The apparatus of claim 1, wherein the apparatus caused to parameterize the EME model includes the apparatus caused to assign electrical conductivity values to surfaces of corresponding non-solid model representing the component parts, and assign electrical resistance values to line segments on the corresponding non-solid model representing the fasteners.

8. The apparatus of claim 1, wherein the apparatus caused to parameterize the EME model includes the apparatus caused to assign one or more of electrical self-impedance, electrical mutual-impedance or electromagnetic shielding values to line segments on the corresponding non-solid model representing the electrical wiring.

9. A method of designing a structural product that includes component parts joined by fasteners, and an installation of electrical wiring, the method comprising:

storing in memory computer-readable program code for an integrated development environment to establish a digital thread in a lifecycle of the structural product; and executing the computer-readable program code, via processing circuitry configured to access the memory, to cause an apparatus to generate a graphical user interface (GUI) from which the integrated development environment is accessible for at least:

accessing a source of authoritative data for the structural product, the authoritative data including a solid model of the structural product, definitions of the fasteners, and definitions of the electrical wiring;

generating an electromagnetic effects (EME) model of the structural product from the authoritative data, including:

defeaturing the solid model to generate a corresponding non-solid model of the structural product;

drawing the fasteners onto the corresponding non-solid model based on the definitions of the fasteners; and drawing the electrical wiring onto the corresponding non-solid model based on the definitions of the electrical wiring;

parameterizing the EME model with one or more electrical properties of the component parts, the fasteners and the electrical wiring, and thereby producing a parameterized EME model;

producing a computational electromagnetics (CEM) model of the structural product from the parameterized EME model, the CEM model representing the component parts, the fasteners and the electrical wiring by a mesh of elements;

performing a CEM analysis in which the CEM model of the structural product is exposed to a simulated EME threat to predict an impact of a corresponding EME threat on the structural product, and from which a corresponding solution is generated; and post-processing the corresponding solution.

10. The method of claim 9, wherein the computer-readable program code is executed to cause the apparatus to generate the GUI including a plurality of graphical control elements arranged to guide a user through the integrated development environment, the plurality of graphical control elements including graphical control elements that are user-selectable for generating the EME model, parameterizing the EME model, and producing the CEM model.

11. The method of claim 9, wherein distinct EME threats have respective model requirements, and defeaturing the solid model includes receiving user-selection of an EME threat from the distinct EME threats, and defeaturing the solid model according to the respective model requirements of the EME threat.

12. The method of claim 9, wherein the integrated development environment provides distinct types of the component parts associated with methods of defeaturing, one or more of the methods of defeaturing being different for different ones of the distinct types of the component parts, and wherein defeaturing the solid model includes receiving user-selection of a type of component part from the distinct types of the component parts, and defeaturing the component parts of the type of component part according to a method of the methods of defeaturing.

13. The method of claim 9, wherein generating the EME model further includes sub-gridding one or more surfaces of the corresponding non-solid model to generate a larger number of corresponding smaller surfaces.

14. The method of claim 9, wherein drawing the fasteners includes at least:

drawing line segments for the fasteners onto the corresponding non-solid model based on the definitions of the fasteners;

determining intersections between the line segments and surfaces of the corresponding non-solid model; and redrawing the line segments between surface faces based on the intersections, the line segments as redrawn representing the fasteners in the corresponding non-solid model.

15. The method of claim 9, wherein parameterizing the EME model includes assigning electrical conductivity values to surfaces of corresponding non-solid model representing the component parts, and assigning electrical resistance values to line segments on the corresponding non-solid model representing the fasteners.

16. The method of claim 9, wherein parameterizing the EME model includes assigning one or more of electrical self-impedance, electrical mutual-impedance or electromagnetic shielding values to line segments on the corresponding non-solid model representing the electrical wiring.

17. A computer-readable storage medium for designing a structural product that includes component parts joined by fasteners, and an installation of electrical wiring, the computer-readable storage medium being non-transitory and having stored therein computer-readable program code for an integrated development environment to establish a digital thread in a lifecycle of the structural product, the computer-readable program code being executable by processing circuitry to cause an apparatus to generate a graphical user interface (GUI) from which the integrated development environment is accessible to cause the apparatus to at least:
  access a source of authoritative data for the structural product, the authoritative data including a solid model of the structural product, definitions of the fasteners, and definitions of the electrical wiring;
  generate an electromagnetic effects (EME) model of the structural product from the authoritative data, including the apparatus caused to:
    defeature the solid model to generate a corresponding non-solid model of the structural product;
    draw the fasteners onto the corresponding non-solid model based on the definitions of the fasteners; and
    draw the electrical wiring onto the corresponding non-solid model based on the definitions of the electrical wiring;
  parameterize the EME model with one or more electrical properties of the component parts, the fasteners and the electrical wiring, and thereby produce a parameterized EME model;
  produce a computational electromagnetics (CEM) model of the structural product from the parameterized EME model, the CEM model representing the component parts, the fasteners and the electrical wiring by a mesh of elements;
  perform a CEM analysis in which the CEM model of the structural product is exposed to a simulated EME threat to predict an impact of a corresponding EME threat on the structural product, and from which a corresponding solution is generated; and
  post-process the corresponding solution.

18. The computer-readable storage medium of claim 17, wherein distinct EME threats have respective model requirements, and the apparatus caused to defeature the solid model includes the apparatus caused to receive user-selection of an EME threat from the distinct EME threats, and defeature the solid model according to the respective model requirements of the EME threat.

19. The computer-readable storage medium of claim 17, wherein the integrated development environment provides distinct types of the component parts associated with methods of defeaturing, one or more of the methods of defeaturing being different for different ones of the distinct types of the component parts, and
  wherein the apparatus caused to defeature the solid model includes the apparatus caused to receive user-selection of a type of component part from the distinct types of the component parts, and defeature the component parts of the type of component part according to a method of the methods of defeaturing.

20. The computer-readable storage medium of claim 17, wherein the apparatus caused to draw the fasteners includes the apparatus caused to at least:
  draw line segments for the fasteners onto the corresponding non-solid model based on the definitions of the fasteners;
  determine intersections between the line segments and surfaces of the corresponding non-solid model; and
  redraw the line segments between surface faces based on the intersections, the line segments as redrawn representing the fasteners in the corresponding non-solid model.

* * * * *